Figure 1:
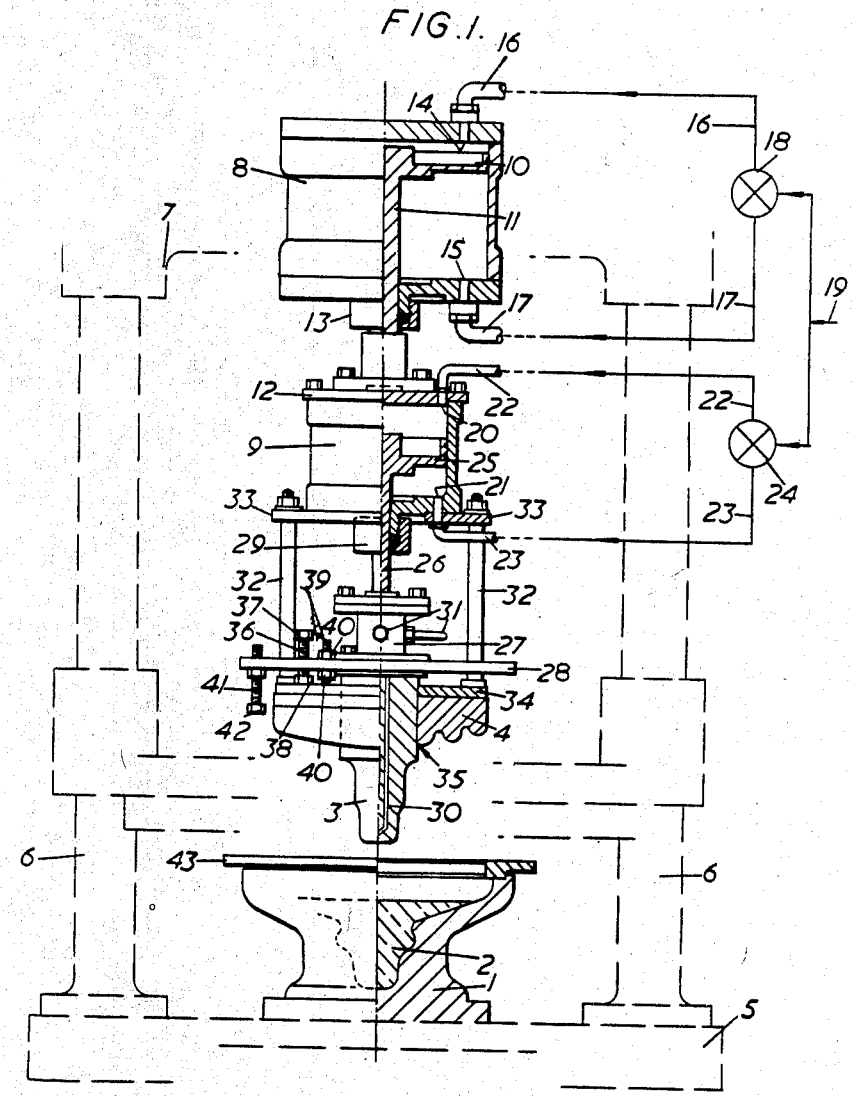

Inventor
John Edward Wilcock
By
Morrison, Kennedy & Campbell
Attorneys

Inventor
John Edward Wilcock
By Morrison, Kennedy
& Campbell Attorneys

United States Patent Office

3,185,560
Patented May 25, 1965

3,185,560
PLURAL PISTON PRESS FORMING APPARATUS
John Edward Wilcock, St. Helens, England, assignor to Pilkington Brothers Limited, Liverpool, England, a corporation of Great Britain
Original application Nov. 10, 1959, Ser. No. 852,120. Divided and this application Aug. 5, 1964, Ser. No. 387,621
Claims priority, application Great Britain, Nov. 17, 1958, 36,965/58
2 Claims. (Cl. 65—314)

This application is divided from application Serial No. 852,120, filed November 10, 1959, and relates to apparatus for moulding a hollow glass article which comprises two contiguous inner and outer parts one of which is thin relative to the other.

When moulding a glass article of irregular thickness by conventional methods in a mould that consists of a fixed mould portion for receiving a charge of molten glass and a single movable pressure member, the thinner parts of the moulded article crack before the pressure member is withdrawn because, before the end of the period of dwell during which the pressure member must be held in its moulding position until the thicker parts have stiffened sufficiently to hold their shape, the thinner parts will have cooled until they have stiffened to such a degree that they cannot continue cooling without cracking on account of the presence of that part of the pressure member which has formed them and which is itself becoming hotter and expanding and is all the more opposing the contraction of the thinner parts.

Moreover if the thinner part of a moulded article is its hollow part it will be entered first by the pressure member, and by its quick cooling in contact with the pressure member before the pressure member has completed the further movement which it must make to mould the thicker parts, the thinner part will become too stiff to accommodate that further movement and will crack.

It is a main object of the present invention to overcome the first of these difficulties by providing a novel apparatus for moulding a hollow glass article in such a way that contraction of the thinner parts as they cool is not opposed while the thicker parts are becoming stiffened sufficiently to hold their shape.

A further object of the invention is to provide apparatus which overcomes the second of these difficulties by forming the thinner parts of an article before the thicker parts are formed so that no flow of glass needs to be enforced in the thinner parts of an article during the forming of the thicker parts.

According to the present invention there is provided apparatus for moulding a hollow glass article comprising contiguous inner and outer parts one of which is thinner than the other, including a hollow mould portion arranged to receive a requisite quantity of molten glass, a fixed frame extending above said mould portion, a first pressure member and a complementary pressure member relatively slidable with respect to each other and co-operating with the hollow mould portion respectively to form therewith a mould cavity for the thinner part of the article and a contiguous mould cavity for the remainder of the article, a main cylinder fixed to the frame, a main double-acting piston slidably mounted in said main cylinder, an auxiliary cylinder connected to the main piston and to the complementary pressure member, an auxiliary double-acting piston slidably mounted in said auxiliary cylinder and connected to the first pressure member, a supply of fluid under pressure, first fluid control means connecting the fluid supply to the main cylinder, said first fluid control means being operable to cause the main piston to lower and raise the auxiliary cylinder and thereby lower and raise the two pressure members in unison to close and open the mould respectively, and being operable to relieve the downward moulding pressure exerted by the complementary pressure member after the mould has been closed, and second fluid control means connecting the fluid supply to the auxiliary cylinder and operable to cause the auxiliary piston to raise the first pressure member relative to the complementary pressure member after the mould has been closed long enough for the thinner part of the article to stiffen sufficiently to hold its shape, said second fluid control means being also operable to lower the first pressure member relative to the complementary pressure member after the mould has been opened and before the two pressure members are again lowered for another mould closing operation.

In order that the invention may be clearly understood an embodiment thereof will now be described by way of example with reference to the accompanying drawings in which:

FIGURE 1 is an elevation partly in section of apparatus according to the invention for moulding hollow glass articles, and FIGURES 2 to 5 respectively illustrate stages in a moulding operation using the apparatus of FIGURE 1.

Referring to FIGURE 1 of the drawings apparatus according to the invention of moulding a hollow glass article comprising two contiguous inner and outer parts one of which is thin relative to the other, comprises a moulding press which includes a hollow mould portion 1 arranged to receive a requisite quantity of molten glass 2. The mould shown in the drawings is for moulding a high-voltage insulator which includes a central hollow part which is the head of the insulator, and a contiguous spread part which is the skirt of the insulator. The central hollow part is thin relative to the spread part.

Co-operating with the hollow mould portion 1 to define the desired mould cavity are an axial pressure member 3 and a complementary concentric pressure member 4, both of which are co-axial with the central axis about which the hollow mould portion 1 is symmetrical. The mould portion 1 is rigidly supported by the base 5 of the moulding press, and the frame 6 of the moulding press is rigidly fixed to the base 5.

The axial and concentric pressure members 3 and 4 are supported from an upper member 7 of the moulding press frame by actuating means which includes a main cylinder 8 which is fixed to the upper member 7, and an auxiliary cylinder 9. Both the main cylinder 8 and the auxiliary cylinder 9 are co-axial with the central axis of the hollow mould portion 1.

A double-acting piston 10 is slidable in the main cylinder 8 and is connected by a main piston rod 11 to a top cover plate 12 of the auxiliary cylinder 9. The main piston rod 11 passes through a gland 13 at the bottom of the main cylinder 8. The main cylinder 8 has an upper port 14 and a lower port 15, and the ports 14 and 15 are respectively connected by pressure lines 16 and 17 to a main two-way valve 18 whose input is connected to a pressure supply line 19. Similarly the auxiliary cylinder has an upper port 20 and a lower port 21, and the ports 20 and 21 are respectively connected by pressure lines 22 and 23 to an auxiliary two-way valve 24, the input to which is also connected to the supply line 19.

A double-acting piston 25 is slidable in the auxiliary cylinder 9 and is connected by an auxiliary piston rod 26 to one end of a coupling member or adaptor 27, the other end of which is fixed to a plate 28. The auxiliary piston rod 26 passes through a gland 29 at the bottom of the auxiliary cylinder 9. The axial pressure member 3 is fixed to the underside of the plate 28 and extends downwardly therefrom. Cooling channels 30 are provided in the axial pressure member 3 for cooling purposes and cooling fluid is supplied to these channels through the coupling member or adaptor 27 by supply pipes 31.

The complementary concentric pressure member 4 is connected by four vertical rods 32 which extend downwardly from the edges of an annular plate 33, which is fixed to the bottom of the auxiliary cylinder 9. The rods 32 pass through holes in the plate 28 and their lower ends are fixed to the cover plate 34 of the pressure member 4. As shown at 35 the concentric pressure member 4 is in sliding contact with the axial member 3.

Four vertical stop members consisting of bolts 36, one of which is shown, are fixed to the top of the concentric member 4 and pass through holes in the plate 28. Each of the bolts 36 has an upper stop consisting of its head 37 and is threaded into the top of the concentric member 4 and locked at any desired position by the lock-nut 38. The head 37 limits the upward movement of the axial member 3 relative to the concentric member 4. Four threaded stop members 39, one of which is shown, are fixed in the plate 28 through which they pass and are secured by nuts 40 on each side of the plate 28 so that the extent to which they project downwards below the plate 28 may be adjusted and locked. These four stop members 39 limit the downward movement of the axial member 3 relative to the concentric member 4. The plate 28 also carries four threaded, adjustable stems 41 spaced symmetrically around its edge. Each of the stems 41 has an abutment 42 formed on its lower end. One of the stems 40 is shown. The abutments 42 are arranged to abut a ring-plate 43 of the mould, which rests upon the hollow mould portion 1, when the axial pressure member 3 has been moved downwardly to its moulding position.

In FIGURE 1 the axial and concentric pressure members 3 and 4 are shown withdrawn away from the mould portion 1. In this initial position the main piston 10 is located in its uppermost position in the main cylinder 8 and the auxiliary piston 25 is located in the lowest position in the auxiliary cylinder 9 to which the stop members 39 allow it to descend according to the required extension of the axial member 3 through the concentric member 4. A complete moulding operation of the apparatus according to the invention for moulding a high-voltage insulator will now be described.

The hollow mould portion 1 is first charged with a requisite quantity of molten glass 2. In order to bring the pressure members 3 and 4 into their initial positions as shown in FIGURE 1, the auxiliary valve 24 is operated to admit air under pressure along line 22 through port 20 to the top of the auxiliary cylinder 9 and the piston 25 descends and causes the axial member 3 to extend through the concentric members 4 as far as the stop members 39 allow. Then the main valve 18 is operated to admit air under pressure along line 16 through port 14 to the top of the main cylinder 8 and the piston descends and moves both the axial member 3 and the concentric member 4 downwardly towards the hollow mould portion 1.

Figure 2:
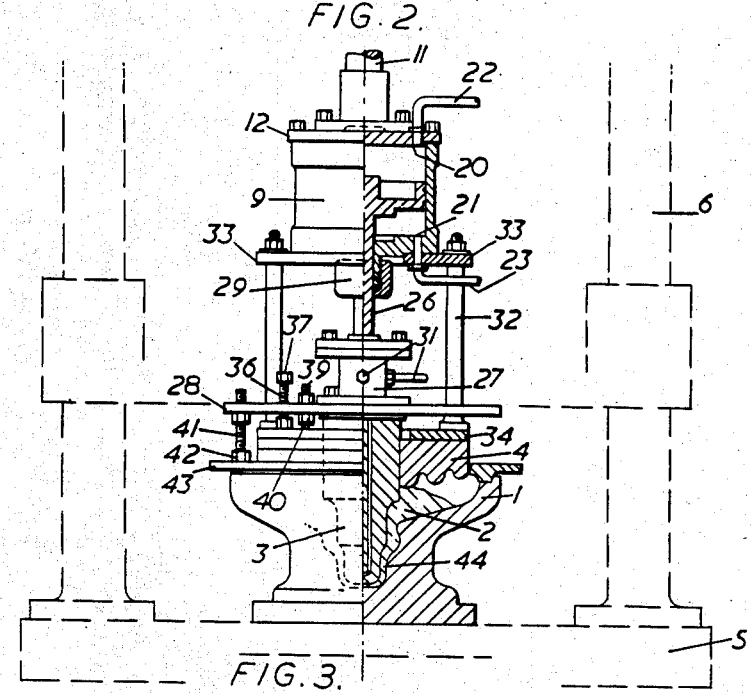

The now fully extended axial member 3 leads the concentric member 4 on entering the mould and displaces the molten glass until the abutments 42 abut the ring-plate 43 on the mould portion 1 as shown in FIGURE 2, and the hollow head of the insulator is shaped in the thinner part 44 of the mould cavity. The thickness of this part 44 of the mould cavity is determined by the operative length of the stems 41 which length is adjustable. When the abutments 42 abut the ring-plate 43 no further pressure is exerted on the glass in the mould by the axial member 3 although air under pressure is forcing the piston 25 in a downward direction.

Figure 3:
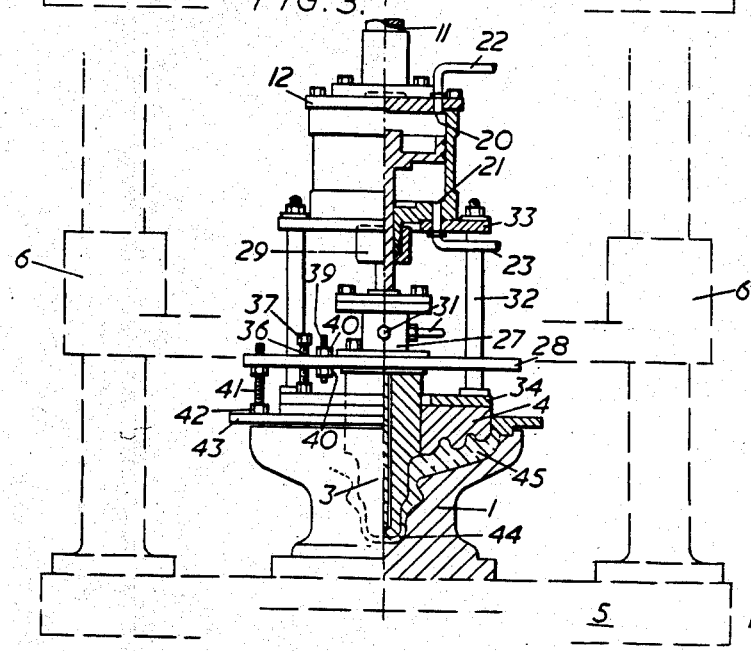

After the axial member 3 has been arrested, the concentric member 4 continues to move relatively to the axial member 3 from the position shown in FIGURE 2, in which a part of the concentric member 4 is already touching the molten glass 2, to the position shown in FIGURE 3, that is until the molten glass 2 completely fills the mould cavity and arrests further movement of the concentric member 4. The mould is then completely closed and the skirt of the insulator is shaped in the thicker part 45 of the mould cavity.

As stated above, when the axial member 3 enters the molten glass 2 it shapes the central thin hollow part of the insulator, displacing some molten glass outwardly into the thicker part 45 of the mould cavity. The concentric member 4 then descends and shapes the spread thicker part or skirt of the insulator. The central thin hollow part of the insulator, which is in contact with the cooled axial member 3, is rapidly stiffening and will become too stiff to contract without breaking around the axial member 3, which is becoming hotter in contact with the hot glass and is therefore expanding. Accordingly as soon as the concentric member 4 has shaped the skirt of the insulator and the thinner hollow part has stiffened sufficiently to hold its shape the axial member 3 is withdrawn by operating the auxiliary two-way valve 24 to admit air under pressure through the pressure line 23 and the port 21; and at the same time the main two-way valve 18 is closed so that, although the concentric member 4 is still held in moulding position on the skirt of the insulator, the pressure on the skirt is relieved in order that the still mobile glass in the skirt shall not exert any fluid pressure upon the central thin hollow part of the insulator.

Any tendency of the moulded insulator to crack is thus prevented by fulfilling the conditions imposed by the fact that, because the time taken by the thinner central hollow head of the insulator to stiffen sufficiently to hold its shape is shorter than that required by the thicker spread skirt of the insulator to stiffen sufficiently to hold its shape, their respective pressure members must be maintained in their moulding position for different times.

If the axial member 3 and the concentric member 4 were both allowed to dwell in the position shown in FIGURE 3 for the same length of time before being withdrawn, the moulded insulator would either be cracked or would not be properly formed. A combined dwell for a time long enough to allow the thicker skirt to stiffen sufficiently to hold its shape would be too long for the thinner hollow head, which would crack. Also if the combined dwell were only long enough to allow the hollow head to stiffen sufficiently to hold its shape, the thicker skirt would not stiffen sufficiently before the pressure members are withdrawn and would run out of shape. Accordingly the axial member 3 is withdrawn after a dwell sufficient to allow the hollow head of the insulator to stiffen sufficiently to hold its shape, and the concentric member 4 remains in forming position until the spread skirt has stiffened sufficiently to hold its shape.

Figure 4:
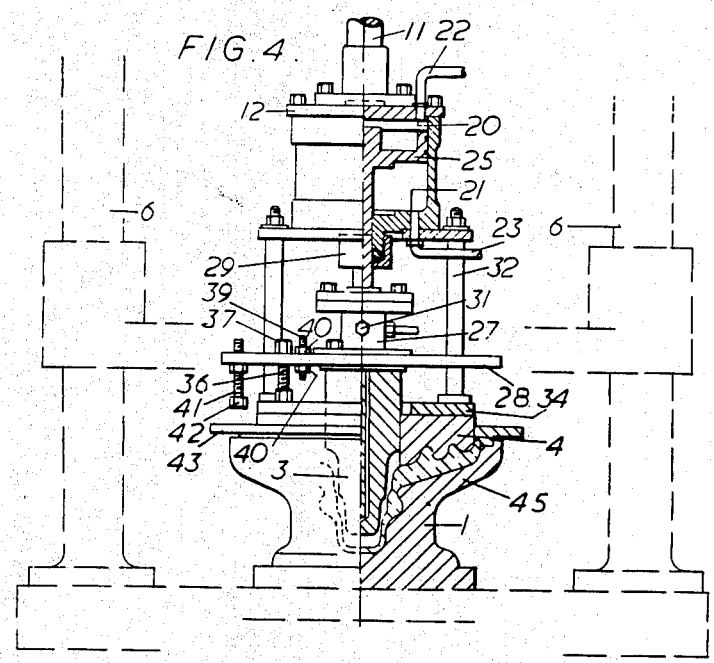
Figure 5:
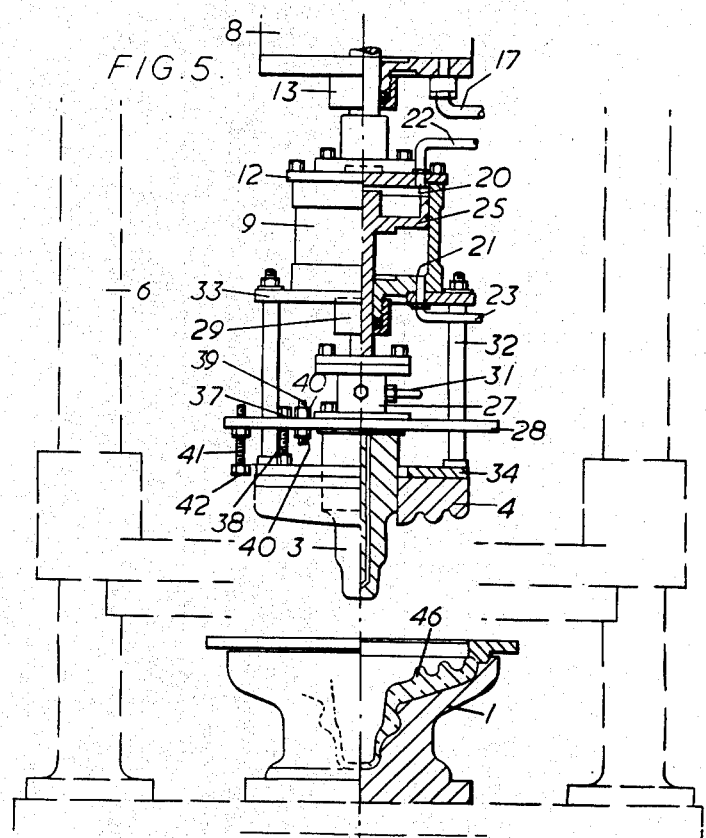

When, in order to withdrawn the axial member 3, air under pressure is admitted to the lower end of the auxiliary cylinder 9 the piston 25 rises in the cylinder 9 only until the top face of the plate 28 abuts the head 37 on the bolt 36 as shown in FIGURE 4. The piston 25 is then in its uppermost position in the cylinder 9. While the axial member 3 is being withdrawn by this small distance the concentric member 4 remains in its moulding position, although without applied force, and the member 4 remains in this forming position until the spread skirt is set up. The main valve 18 is then operated to admit air under pressure to the lower part of the main cylinder 8 through the line 17 and the port 15 so that the concentric member 4 is withdrawn from the mould portion 1. Movement of the piston 10 up the cylinder 8 continues until the pressure members are wholly withdrawn to the position shown in FIGURE 5, and access is then permitted to the moulded high-voltage insulator 46, which is then separated from the lower hollow mould portion 1.

It will be understood that, although the apparatus has been described herein with reference to the manufacture of a moulded glass high-voltage insulator, this apparatus can also be employed for the manufacture of other glass articles, such as for example, a cathode-ray tube which has a central hollow part, or neck, and a contiguous spread part which forms the flared walls of the cathode-ray tube extending away from the neck towards the face of the cathode-ray tube and of greater thickness than the neck.

Although the actuating means has been described as being supplied with air under pressure, it will be understood that any other suitable working fluid may be used in place of air, for example a liquid. The main valve 18 and auxiliary valve 24 may be adjustable manually or, if the apparatus is to be operated automatically, by control members which will operate the valves at the appropriate times in the moulding of an article.

I claim:

1. Apparatus for moulding a hollow glass article comprising contiguous inner and outer parts one of which is thinner than the other, including a hollow mould portion arranged to receive a requisite quantity of molten glass, a fixed frame extending above said mould portion, a first pressure member and a complementary pressure member relatively slidable with respect to each other and co-operating with the hollow mould portion respectively to form therewith a mould cavity for the thinner part of the article and a contiguous mould cavity for the remainder of the article, a main cylinder fixed to the frame, a main double-acting piston slidably mounted in said main cylinder, an auxiliary cylinder connected to the main piston and to the complementary pressure member, an auxiliary double-acting piston slidably mounted in said auxiliary cylinder and connected to the first pressure member, a supply of fluid under pressure, first fluid control means connecting the fluid supply to the main cylinder, said first fluid control means being operable to cause the main piston to lower and raise the auxiliary cylinder and thereby lower and raise the two pressure members in unison to close and open the mould respectively, and being operable to relieve the downward moulding pressure exerted by the complementary pressure member after the mould has been closed, and second fluid control means connecting the fluid supply to the auxiliary cylinder and operable to cause the auxiliary piston to raise the first pressure member relative to the complementary pressure member after the mould has been closed long enough for the thinner part of the article to stiffen sufficiently to hold its shape, said second fluid control means being also operable to lower the first pressure member relative to the complementary pressure member after the mould has been opened and before the two pressure members are again lowered for another mould closing operation.

2. Apparatus according to claim 1, for moulding a glass insulator comprising a central hollow head and a spread adjoining skirt, the hollow head having a wall which is thinner than the skirt, wherein the hollow mould portion is symmetrical about a central axis and has a deep central depression for moulding the insulator head and shallow sides for moulding the skirt, the first pressure member is an axial pressure member of circular cross section and elongated form to fit into said central depression of the mould portion to define therewith a mould cavity for the head of the insulator, and the complementary pressure member is an annular pressure member whose lower face is formed with annular corrugations and which co-operates with said shallow sides of the mould portion to form a mould cavity for the insulator skirt.

References Cited by the Examiner
UNITED STATES PATENTS

| 708,326 | 9/02 | Ebeling | 65—318 |
| 998,673 | 7/11 | Burleigh | 65—314 |
| 1,030,252 | 6/12 | Burleigh | 65—314 |
| 2,011,980 | 8/35 | Miller | 65—314 |
| 2,146,346 | 2/39 | Nelson | 65—314 |

DONALL H. SYLVESTER, *Primary Examiner.*